(12) United States Patent
Mueller et al.

(10) Patent No.: US 12,225,385 B2
(45) Date of Patent: Feb. 11, 2025

(54) LOW-LATENCY NETWORK EDGE SPECTRUM-AS-A-SERVICE CONTROLLER

(71) Applicant: Dell Products, L.P., Round Rock, TX (US)

(72) Inventors: Julius Mueller, Santa Cruz, CA (US); Ihab Tarazi, Burlingame, CA (US)

(73) Assignee: Dell Products, L.P., Round Rock, TX (US)

( * ) Notice: Subject to any disclaimer, the term of this patent is extended or adjusted under 35 U.S.C. 154(b) by 309 days.

(21) Appl. No.: 17/644,671

(22) Filed: Dec. 16, 2021

(65) Prior Publication Data

US 2023/0199507 A1 Jun. 22, 2023

(51) Int. Cl.
*H04W 16/10* (2009.01)
*H04W 60/04* (2009.01)
*H04W 72/23* (2023.01)
*H04W 84/04* (2009.01)
*H04W 88/18* (2009.01)

(52) U.S. Cl.
CPC .......... *H04W 16/10* (2013.01); *H04W 72/23* (2023.01); *H04W 60/04* (2013.01); *H04W 84/042* (2013.01); *H04W 88/18* (2013.01)

(58) Field of Classification Search
None
See application file for complete search history.

(56) References Cited

U.S. PATENT DOCUMENTS

| | | | |
|---|---|---|---|
| 8,199,768 B1 | 6/2012 | Gossett et al. | |
| 10,039,105 B1 * | 7/2018 | Baeder | H04W 72/0453 |
| 10,271,351 B1 * | 4/2019 | Wang | H04L 5/0091 |
| 10,575,185 B2 | 2/2020 | Li et al. | |
| 11,153,762 B1 * | 10/2021 | Routt | H04W 16/14 |
| 11,356,499 B1 * | 6/2022 | Singh | H04L 69/18 |
| 11,528,615 B2 | 12/2022 | Mueck et al. | |
| 11,528,725 B1 * | 12/2022 | Qureshi | H04W 16/14 |
| 11,778,480 B2 * | 10/2023 | Kakinada | H04W 16/14 370/329 |

(Continued)

FOREIGN PATENT DOCUMENTS

WO 2014/160228 A1 10/2014

OTHER PUBLICATIONS

International Search Report and Written Opinion received for PCT Application Serial No. PCT/US2022/053044 dated Mar. 28, 2023, 14 pages.

(Continued)

*Primary Examiner* — Gregory B Sefcheck
(74) *Attorney, Agent, or Firm* — Amin, Turocy & Watson, LLP

(57) ABSTRACT

A low-latency network edge spectrum-as-a-service controller is described herein. A method as described herein can include acquiring, by a system comprising a processor from a spectrum access system, first access rights to a first spectrum band; determining, by the system, availability of a second spectrum band, wholly contained within the first spectrum band, in response to a request, received from network equipment of a radio access network, for second access rights to the second spectrum band; and, in response to the second spectrum band being determined to be available, granting, by the system, the second access rights to the second spectrum band to the network equipment.

20 Claims, 13 Drawing Sheets

(56) References Cited

U.S. PATENT DOCUMENTS

| | | | | |
|---|---|---|---|---|
| 11,871,284 | B1* | 1/2024 | Edara | H04W 74/0816 |
| 2014/0220999 | A1* | 8/2014 | Cordeiro | H04W 72/53 |
| | | | | 455/454 |
| 2016/0150415 | A1* | 5/2016 | Laneman | H04W 16/14 |
| | | | | 455/452.2 |
| 2016/0183259 | A1* | 6/2016 | Mueck | H04W 72/0453 |
| | | | | 370/329 |
| 2017/0208476 | A1* | 7/2017 | Khambekar | H04W 16/14 |
| 2017/0374557 | A1* | 12/2017 | Mueck | H04W 72/0453 |
| 2018/0115903 | A1* | 4/2018 | Badic | H04W 12/03 |
| 2018/0132111 | A1 | 5/2018 | Mueck et al. | |
| 2018/0146380 | A1* | 5/2018 | Srikanteswara | H04W 16/14 |
| 2018/0242165 | A1* | 8/2018 | Macmullan | H04W 16/18 |
| 2018/0288621 | A1* | 10/2018 | Markwart | H04W 16/14 |
| 2018/0317093 | A1 | 11/2018 | Li et al. | |
| 2018/0332660 | A1* | 11/2018 | Mueck | H04W 76/18 |
| 2019/0104489 | A1* | 4/2019 | Huang | H04W 8/24 |
| 2019/0124665 | A1* | 4/2019 | Singh | H04W 72/52 |
| 2019/0132776 | A1* | 5/2019 | Markwart | H04W 36/16 |
| 2019/0132853 | A1 | 5/2019 | Mitola, III et al. | |
| 2019/0335337 | A1* | 10/2019 | Damnjanovic | H04W 74/0808 |
| 2019/0364435 | A1* | 11/2019 | Ahmavaara | H04W 16/14 |
| 2019/0364565 | A1* | 11/2019 | Hmimy | H04W 36/16 |
| 2020/0029222 | A1* | 1/2020 | Mueck | H04B 1/715 |
| 2020/0112950 | A1* | 4/2020 | Chen | H04W 36/08 |
| 2020/0305004 | A1* | 9/2020 | Ansley | H04L 12/2801 |
| 2020/0382963 | A1* | 12/2020 | Mueck | H04W 24/02 |
| 2021/0022007 | A1* | 1/2021 | McFadden | H04W 28/26 |
| 2021/0099886 | A1* | 4/2021 | Taneja | H04W 72/0453 |
| 2021/0136666 | A1* | 5/2021 | Srivastava | H04W 48/06 |
| 2021/0153029 | A1* | 5/2021 | Mueck | H04W 16/14 |
| 2021/0211880 | A1* | 7/2021 | Khawer | H04W 60/06 |
| 2021/0211887 | A1* | 7/2021 | Jones | H04W 28/06 |
| 2021/0211889 | A1 | 7/2021 | Buddhikot et al. | |
| 2021/0219143 | A1 | 7/2021 | Khalid et al. | |
| 2021/0227628 | A1* | 7/2021 | Sevindik | H04W 88/10 |
| 2021/0243612 | A1* | 8/2021 | Kempf | H04W 12/037 |
| 2021/0368349 | A1* | 11/2021 | Bandyopadhyay | H04W 52/40 |
| 2021/0385664 | A1* | 12/2021 | Nguyen | H04W 72/541 |
| 2022/0007451 | A1* | 1/2022 | Wang | H04W 24/04 |
| 2022/0046641 | A1* | 2/2022 | Sayenko | H04W 72/0453 |
| 2022/0060904 | A1* | 2/2022 | Das | H04W 48/18 |
| 2022/0132321 | A1* | 4/2022 | Sun | H04B 17/382 |
| 2022/0183093 | A1* | 6/2022 | Sevindik | H04W 76/27 |
| 2022/0191675 | A1* | 6/2022 | Mukherjee | H04W 72/1268 |
| 2022/0264287 | A1* | 8/2022 | Vaidya | H04W 88/08 |
| 2022/0303782 | A1* | 9/2022 | Litjens | H04W 16/14 |
| 2022/0346030 | A1* | 10/2022 | Al-Mufti | H04W 52/367 |
| 2022/0361089 | A1* | 11/2022 | Ioffe | H04W 52/0212 |
| 2022/0361184 | A1* | 11/2022 | Beck | H04W 16/14 |
| 2022/0386132 | A1* | 12/2022 | Sevindik | H04W 16/12 |
| 2022/0394491 | A1* | 12/2022 | Khawer | H04W 12/06 |
| 2022/0417761 | A1* | 12/2022 | Khawer | H04W 16/14 |
| 2022/0417763 | A1 | 12/2022 | Ioffe et al. | |
| 2023/0007668 | A1* | 1/2023 | Al-Mufti | H04W 16/14 |
| 2023/0021659 | A1* | 1/2023 | Hafeez | H04W 56/001 |
| 2023/0035635 | A1* | 2/2023 | Levine | H04W 16/14 |
| 2023/0038751 | A1* | 2/2023 | Mueller | H04W 72/0453 |
| 2023/0040246 | A1* | 2/2023 | Mueller | H04W 28/0942 |
| 2023/0043541 | A1* | 2/2023 | Mueller | H04W 16/14 |
| 2023/0044576 | A1* | 2/2023 | Mueller | H04W 72/0453 |
| 2023/0045596 | A1* | 2/2023 | Mueller | H04W 24/02 |
| 2023/0098387 | A1* | 3/2023 | Hafeez | H04W 52/143 |
| | | | | 370/329 |
| 2023/0180246 | A1* | 6/2023 | Singh | H04W 72/23 |
| | | | | 370/329 |
| 2023/0199851 | A1 | 6/2023 | Mukherjee et al. | |
| 2023/0284033 | A1* | 9/2023 | Bandyopadhyay | |
| | | | | H04W 60/005 |
| | | | | 370/329 |
| 2023/0362970 | A1* | 11/2023 | Furuichi | H04W 72/1215 |
| 2024/0015520 | A1 | 1/2024 | Khawer et al. | |
| 2024/0022914 | A1 | 1/2024 | Kakinada et al. | |
| 2024/0215002 | A1 | 6/2024 | Sevindik | |

OTHER PUBLICATIONS

Xin et al., "On Dynamic Spectrum Allocation in Geo-Location Spectrum Sharing Systems", IEEE Transactions On Mobile Computing, vol. 18, No. 4, Apr. 2019, 11 pages.

International Search Report and Written Opinion received for PCT Application Serial No. PCT/US2022/053045 dated May 2, 2023, 16 pages.

Winnforum Standards, "Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, May 18, 2020, 60 pages.

Palola et al, "Field Trial of the 3.5 Ghz Citizens Broadband Radio Service Governed by a Spectrum Access System (SAS)", IEEE, International Symposium on Dynamic Spectrum Access Networks, 2017, 9 pages.

Shi et al., "Challenges and New Directions in Securing Spectrum Access Systems", IEEE, Internet of Things Journal, vol. 08, No. 8, Apr. 15, 2021, 21 pages.

Non-Final Office Action received for U.S. Appl. No. 17/646,782, dated Apr. 4, 2024, 326 pages.

Final Office Action received for U.S. Appl. No. 17/646,782, dated Sep. 26, 2024, 44 pages.

International Preliminary Report on Patentability for PCT Application No. PCT/US2022/053045 mailed Jul. 18, 2024, 8 pages.

European Office Action mailed Aug. 13, 2024 for European Patent Application No. 22851178.8, 3 pages.

International Preliminary Report on Patentability for PCT Application No. PCT/US2022/053044 mailed Jun. 27, 2024, 8 pages.

European Office Action mailed Jul. 23, 2024 for European Patent Application No. 22850822.2, 3 pages.

\* cited by examiner

LOW-LATENCY NETWORK EDGE SPECTRUM-AS-A-SERVICE CONTROLLER

BACKGROUND

Citizens Broadband Radio Service (CBRS) is a wireless spectrum band of the 3.5 GHz band, presently a 150 MHz band running from 3550 MHz to 3700 MHz, that has been designated by the United States government for private telecommunication use. Entities such as corporations, universities, governmental agencies, or other enterprises can obtain prioritized access to sections of the CBRS band within a given geographic area by requesting a Priority Access License (PAL) from a Spectrum Access System (SAS). In general, a PAL grants the licensee prioritized access to one or more 10 MHz sections of the CBRS band within a given geographic area for a fixed period of time, e.g., three years. In this way, CBRS can enable enterprises to build out private communication networks without the expense associated with licensed spectrum or the potential for congestion associated with unlicensed spectrum.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include a master grant acquisition component that obtains, from a spectrum access system via a spectrum request procedure, an access license for a first spectrum band. The executable components can further include a spectrum mapping component that determines availability of a second spectrum band, wholly contained within the first spectrum band, in response to receiving an access request for the second spectrum band from network equipment associated with a radio access network. The executable components can additionally include a secondary grant provisioning component that, in response to the spectrum mapping component determining that the second spectrum band is available, grants access to the second spectrum band to the network equipment.

In another implementation, a method is described herein. The method can include acquiring, by a system including a processor, first access rights to a first spectrum band from a spectrum access system. The method can also include determining, by the system, availability of a second spectrum band, wholly contained within the first spectrum band, in response to a request, received from network equipment of a radio access network, for second access rights to the second spectrum band. The method can further include, in response to the second spectrum band being determined to be available, granting, by the system, the second access rights to the second spectrum band to the network equipment.

In an additional implementation, a non-transitory machine-readable medium including computer executable instructions is described herein. The instructions, when executed by a processor of a data storage system, can facilitate performance of operations including receiving, from a spectrum access system, an allocation for a first spectrum band; determining availability of a second spectrum band, wholly contained within the first spectrum band, in response to a request, received from network equipment of a radio access network, for access to the second spectrum band; and, in response to the second spectrum band being determined to be available, granting the access to the second spectrum band to the network equipment.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
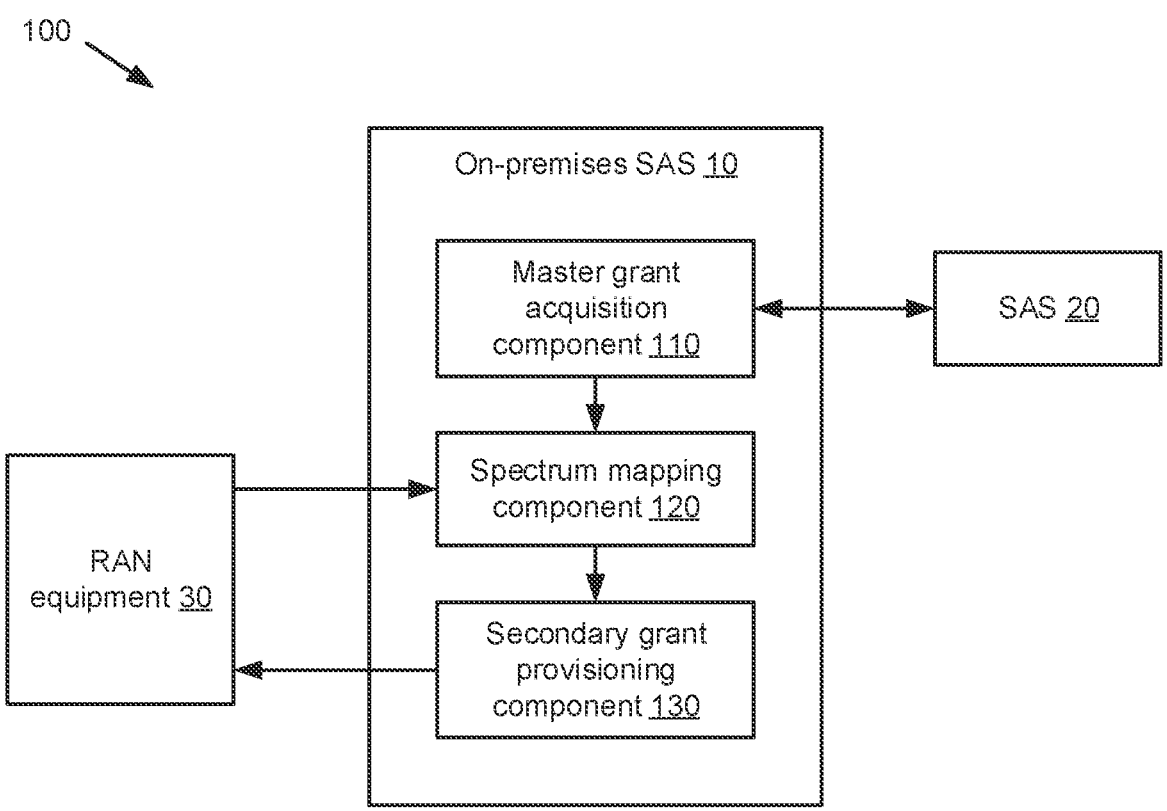
FIG. 1 is a block diagram of a system that facilitates a low-latency network edge spectrum-as-a-service controller in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein facilitate the implementation of a low-latency spectrum-as-a-service controller, e.g., a CBRS SAS, at the edge of a communication network enabled via the controller. By way of example, a private communication network utilizing the CBRS band can be established on given physical premises via a hierarchical and distributed SAS operating on or near the physical premises, referred to herein as an "on-premises SAS." An on-premises SAS as described herein can operate in combination with a centralized SAS to facilitate access to spectrum resources, e.g., portions of the CBRS band, with reduced latency. While various example implementations provided herein relate to specific radio access technologies, interfaces, etc., it is noted that other radio access technologies, interfaces, etc., could also be used. Unless explicitly stated otherwise, the following description and claimed subject matter are not intended to be limited to any specific radio access technology, interfaces, or other aspects.

Due to the limited availability of wireless spectrum, it is generally desirable to regulate access to spectrum bands. For instance, CBRS provides for three distinct access tiers with varying levels of access rights, which are as follows:

1) Incumbent Access—Incumbent Access is the highest access tier in CBRS and includes various military and/or other governmental users along with other specifically designated entities. Users in the Incumbent Access tier are permitted access to designated portions of the CBRS band at any time. Users in other access tiers are prohibited from operating in the CBRS band in a manner that would cause harmful interference to a CBRS user.
2) Priority Access—Access to the Priority Access tier is regulated via Priority Access Licenses (PALs) obtained through a SAS, e.g., by way of a competitive bidding process. A PAL grants prioritized access to a given portion of the CBRS band (e.g., a 10 MHz sub-band) within a defined geographic area for a defined length of time (e.g., 3 years). More particularly, a PAL grants a Priority Access user full access rights to the associated CBRS spectrum subject to the terms of the PAL and any restrictions placed on the spectrum by Incumbent Access users.
3) General Authorized Access—The General Authorized Access tier is designed to enable a wide range of potential users access to any CBRS resources that are not assigned to and/or being utilized by users in the other access tiers. Typically, General Authorized Access users are required to vacate any utilized resources if their use of the resources conflicts with, or causes interference to, an Incumbent Access or Priority Access user.

Due to the precision in time, location, and signal strength associated with CBRS spectrum grants, CBRS spectrum can be controlled via centralized, cloud-based SAS deployments. However, while cloud deployments ensure global and high-availability services, they can also result in higher latencies between spectrum requests, e.g., between a radio access network (RAN) and a SAS. For instance, registration of a CBRS-enabled device, also referred to as a Citizens Broadband Radio Service Device or CBSD, and a corresponding spectrum request involves the transmission of 3 bidirectional message exchanges, including 6 messages in total, until requested spectrum can be utilized through a CBSD.

In terms of theoretical computer science, applying the CAP (Consistency, Availability, Partitioning tolerance) theorem to the centralized SAS/CBRS architecture demonstrates that this architecture focuses on consistency and availability without introducing partitioning tolerance. While partitioning tolerance is missing in a centralized CBRS architecture, it is nonetheless desirable as it enables low latency services such as Ultra-Reliable Low Latency Communications (URLLC) on demand and/or as a service, device-to-device (d2d) direct communication, uplink-dominated time sensitive networks, and so on.

In view of the above, various implementations herein provide for an on-premises distributed and hierarchical SAS, which can enable partitioning tolerance next to availability and consistency. This, in turn, can enable significantly faster spectrum grants as compared to a centralized SAS. For instance, decentralizing the SAS can enable Fifth Generation (5G) URLLC services with on-demand spectrum grants, resulting in an increase in the number of devices with access to an always-on control channel and/or on-demand high-throughput ultra-low-latency channels. Other advantages of the implementations shown and described herein are also possible.

Additionally, as CBRS spectrum can be divided and partitioned on the basis of geography, an on-premises SAS as described herein can operate within an underlying hierarchical system that can be globally distributed and managed independently. To handle cases involving on-premises SASs sharing an adjacent border, further coordination between the adjacent on-premises SASs can be performed.

With reference now to the drawings, FIG. 1 illustrates a block diagram of a system 100 that facilitates a low-latency network edge spectrum-as-a-service controller in accordance with various implementations described herein. As shown in FIG. 1, system 100 includes an on-premises SAS 10 associated with a master grant acquisition component 110, a spectrum mapping component 120, and a secondary grant provisioning component 130, which can operate as described in further detail below. In an implementation, the components 110, 120, 130 of the on-premises SAS 10 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 13.

With respect now to the components 110, 120, 130 of the on-premises SAS 10 shown in FIG. 1, the master grant acquisition component 110 can obtain, from a centralized SAS 20 via a spectrum request procedure, an access license for a first spectrum band. In an implementation, the access license can be and/or otherwise include a PAL that grants access rights to a section of the first spectrum band (e.g., one or more 10 MHz sections of the CBRS band, etc.) for a given location, transmit power, and/or length of time. As used herein, an initial allocation of resources obtained via the SAS 20 is referred to as a master grant. The master grant is described in further detail below with respect to FIG. 2.

The spectrum mapping component 120 of the on-premises SAS 10 can determine the availability of a second spectrum band, e.g., a spectrum band that is wholly contained within and/or otherwise associated with the first spectrum band for which a master grant has been acquired by the master grant acquisition component 110, in response to receiving an access request for the second spectrum band from a RAN via RAN equipment 30 associated with the RAN.

Based on the availability of the requested spectrum as determined by the spectrum mapping component 120, the secondary grant provisioning component 130 of the on-premises SAS 10 can provide a response to the RAN equipment 30 that either grants or denies access rights to the requested spectrum. For instance, in response to the spectrum mapping component 120 determining that the spectrum band requested by the RAN equipment 30 is available, the secondary grant provisioning component can grant access to the requested spectrum band to the RAN equipment 30. As used herein, an allocation of resources within a master grant to RAN equipment 30 is referred to as a secondary grant. The secondary grant is described in further detail below with respect to FIG. 2.

In an implementation, the on-premises SAS 10 and the RAN equipment 30 can be deployed on the same network equipment and/or different network equipment. For example, the RAN equipment 30 in system 100 can be and/or otherwise include a cellular access point, such as an eNodeB (eNB) or gNodeB (gNB), and the on-premises SAS 10 can be implemented via one or more network functions at the access point. Also or alternatively, the on-premises SAS 10 of system 100 can be implemented via a RAN Intelligent Controller (RIC) that is associated with the RAN equipment 30 and/or a standalone server or other device that provides on-premises SAS functionality to one or more RANs, e.g., one or more RANs located in an area that includes the RAN associated with the RAN equipment 30. As another alternative, network functions used to implement on-premises SAS 10 can be virtualized and/or otherwise instantiated via one or more virtual machines, which in turn can operate from one or more physical computing devices. Other implementations are also possible.

Figure 2:
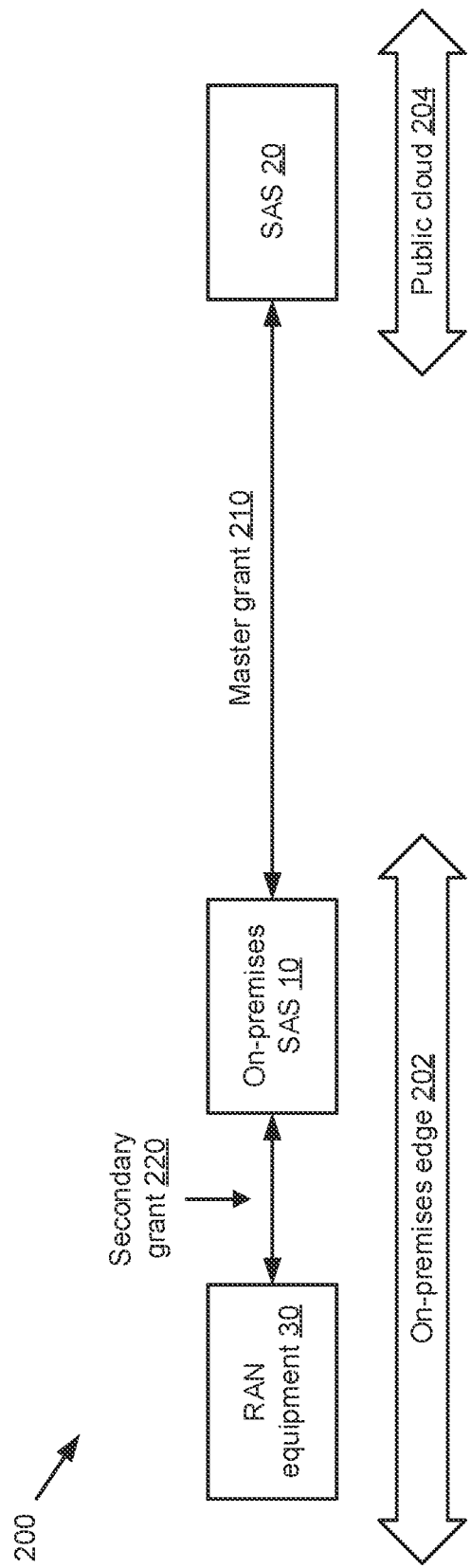
FIG. 2 is a diagram depicting proxy operations that can be performed by an on-premises spectrum access system in accordance with various implementations described herein.

Referring now to FIG. 2, a diagram 200 depicting proxy operations that can be performed by an on-premises SAS 10 is provided. Repetitive description of like elements that are employed in other embodiments described herein is omitted for brevity. Diagram 200 as shown in FIG. 2 depicts an on-premises SAS 10, a SAS 20, and RAN equipment 30, which can interact with each other as described above with respect to FIG. 1. As further shown in diagram 200, the on-premises SAS 10 and the RAN equipment 30 can operate within, and/or otherwise be associated with, an on-premises edge 202. As used herein, the on-premises edge 202 represents one or more edge network functions and/or equipment corresponding to a RAN that is associated with the RAN equipment 30.

While the term "on-premises edge" is used herein for simplicity, it is noted that the RAN equipment 30 and the on-premises SAS 10 need not occupy the same physical premises. For instance, in some implementations the RAN equipment 30 can be associated with a RAN that is situated at a given physical premises, and the on-premises SAS 10 can be physically situated off the physical premises associated with the RAN equipment 30, e.g., at a site adjacent to or otherwise physically near the site of the RAN and/or other RANs (not shown in FIG. 2) to which the on-premises SAS 10 also provides service. Additional details regarding the implementation of the on-premises edge 202 are described in further detail below with respect to FIG. 6. Additionally, components and techniques that can be utilized by the on-premises SAS 10 to manage and/or facilitate coordination between multiple RAN sites are described in further detail below with respect to FIG. 8.

As further shown in diagram 200, the SAS 20 can be implemented as a cloud service associated with a public cloud 204, e.g., a cloud computing platform implemented by a cloud service provider. Alternatively, the SAS 20 can be implemented via one or more standalone servers or other physical computing devices. In either the case of a cloud-based SAS 20 or a SAS 20 implemented via dedicated physical computing devices, the on-premises SAS 10 and/or other elements of the on-premises edge 202 can communicate with the SAS 20 over one or more data networks or internetworks, such as the Internet.

As additionally shown by diagram 200, the on-premises SAS 10 can interact with the SAS 20 to obtain a master grant 210 for spectrum resources from the SAS 20. In an implementation in which these spectrum resources correspond to CBRS spectrum, the on-premises SAS 10 can initiate a CBSD registration exchange with the SAS 20, which involves three messages sent from the on-premises SAS 10 to the SAS 20 and three responsive messages returned from the SAS 20 to the on-premises SAS 10. Examples of specific messages that can be transmitted via this exchange are shown and described in further detail below with respect to FIGS. 9-11. As a result of the CBSD registration exchange, the SAS 20 can either confirm the master grant 210, e.g., by providing the on-premises SAS 10 a PAL corresponding to the granted spectrum, or deny the master grant 210, e.g., in response to no CBSD spectrum resources being available for the requested area, transmission power, or time interval.

At the conclusion of the CBSD registration process between the on-premises SAS 10 and the SAS 20, the entirety of the spectrum corresponding to the master grant 210 is registered to the on-premises SAS 10 at the SAS 20. Thus, from the perspective of the SAS 20, the on-premises SAS 10 is the license holder for the resources associated with the master grant 210. At the on-premises SAS 10, the resources associated with the master grant 210 can be added to a pool or inventory of available spectrum resources, which can subsequently be made available to RAN equipment 30 and/or other requesting entities. Techniques that can be utilized by the on-premises SAS 10 for maintaining an inventory of available resources are described in further detail below with respect to FIG. 3.

As further shown by diagram 200, RAN equipment 30, and/or another suitable requesting entity, can request a secondary grant 220 of access rights to some or all of the resources granted to the on-premises SAS 10 by the SAS 20 via the master grant 210. Unlike the CBSD registration process between the on-premises SAS 10 and the SAS 20 as described above, the RAN equipment 30 shown in diagram 200 can request spectrum access rights from the on-premises SAS 10 via a single message exchange. For instance, the RAN equipment 30 can provide a single registration message to the on-premises SAS 10 indicating desired spectrum resources, and the on-premises SAS 10 can confirm or deny the secondary grant 220 by sending a single registration response message to the RAN equipment 30, e.g., without sending any other messages to the RAN equipment 30 corresponding to the request. Examples of exchanges that can occur between the RAN equipment 30 and the on-premises SAS 10 in this manner are described in further detail below with respect to FIGS. 9-11. By enabling a secondary grant 220 of spectrum resources to be obtained by the RAN equipment 30 via a single bidirectional message exchange, the on-premises SAS 10 can facilitate on-demand spectrum access to the RAN equipment 30, e.g., with substantially lower latency than that associated with an access request submitted by the RAN equipment 30 to the SAS 20 directly.

Figure 3:
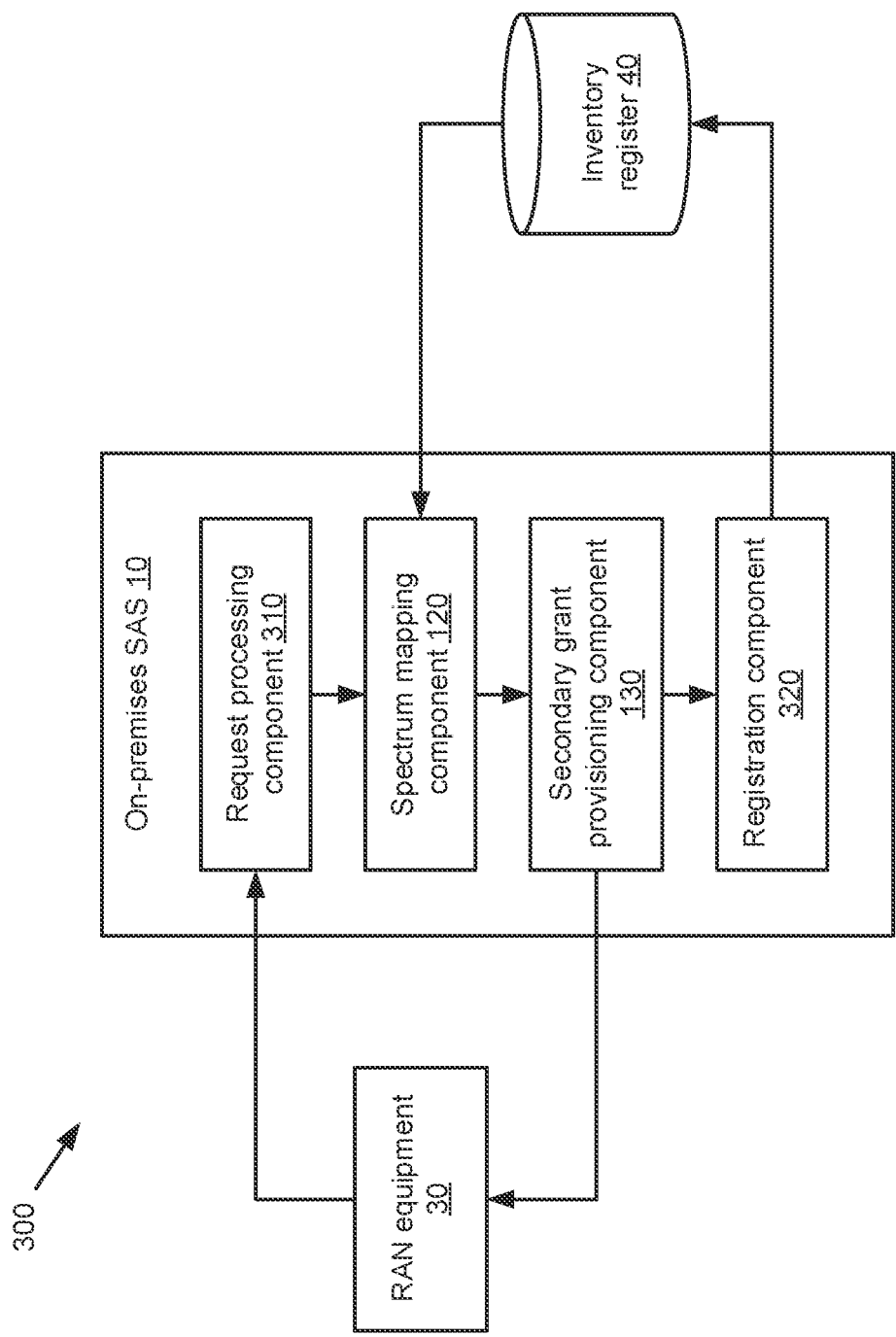
FIG. 3 is a block diagram of a system for maintaining and utilizing a spectrum inventory register in accordance with various implementations described herein.

With reference next to FIG. 3, a block diagram of a system 300 for maintaining and utilizing a spectrum inventory register is illustrated. Repetitive description of like elements that are employed in other embodiments described herein is omitted for brevity. System 300 as shown in FIG. 3 includes an on-premises SAS 10 and RAN equipment 30, which can operate as described above. As further shown in FIG. 3, the on-premises SAS 10 of system 300 includes a request processing component 310 that can receive an access request for spectrum resources, e.g., a request for a secondary grant 220 as shown in FIG. 2, via a registration request message and/or other suitable signaling.

In response to the request processing component 310 receiving a resource request from the RAN equipment 30, the spectrum mapping component 120 of the on-premises SAS 10 can determine the availability of the requested resources by consulting an inventory register 40. In an implementation, the inventory register 40 is a data register and/or other data structure that includes information relating to a pool or other group of spectrum resources that are available to the on-premises SAS 10, e.g., via one or more master grants from a SAS 20 as described above. In addition, the inventory register 40 can contain information relating to secondary grants of the resources available to the on-premises SAS 10 that have been granted to respective network equipment. For instance, for a given secondary grant, the inventory register can contain information relating to the specific resources to which access was granted via the secondary grant, the network (or network equipment) to which the secondary grant was issued, a location and/or transmit power associated with said network, and/or other suitable information. Other information could also be stored in the inventory register 40.

In an implementation, the technique(s) utilized by the spectrum mapping component 120 for determining availability of requested resources can vary depending on whether the request provided by the RAN equipment 30 indicates a specific frequency range. As used herein, a request indicating a specific frequency range is referred to as a specific spectrum request, while a request that does not indicate a specific frequency range is referred to as an unspecific spectrum request. For a specific spectrum request, the spectrum mapping component 120 can determine whether the specific frequency resources requested by the RAN equipment 30 are available, e.g., by determining whether the entirety of the requested spectrum frequency range is unassigned in the inventory register. If the requested specific spectrum is available, the secondary grant provisioning component 130 can provide the RAN equipment 30 with a secondary grant for the requested resources. Otherwise, the secondary grant provisioning component 130 can send a denial of the requested resources to the RAN equipment 30 and/or perform other actions, such as facilitating a modification of the original request such that the modified request corresponds to unused resources as indicated by the inventory register 40.

For an unspecific spectrum request, the spectrum mapping component 120 can identify an available (unassigned) spectrum band as given by the inventory register 40 that satisfies respective properties of the request, such as a requested bandwidth, location, transmit power, or the like. Also or alternatively, in selecting resources to grant in response to an unspecific spectrum request, the spectrum mapping component 120 can consider secondary grants to other nearby networks or devices, spectrum optimization techniques, and/or other criteria in determining a spectrum band to assign to the requesting RAN equipment 30. Subsequently, the secondary grant provisioning component 130 can provide a secondary grant to the RAN equipment 30 that specifies the granted frequency resources, and/or other related information as appropriate.

The on-premises SAS 10 shown in FIG. 3 additionally includes a registration component 320, which can assign granted frequency resources to the RAN equipment 30 in the inventory register 40 in response to the secondary grant provisioning component 130 successfully granting those resources to the RAN equipment 30. In an implementation, the registration component 320 can operate in substantially the same manner for a specific spectrum grant or an unspecific spectrum grant, though the registration component 320 could indicate the type of grant and/or other appropriate information in the inventory register 40 as desired.

Figure 4:
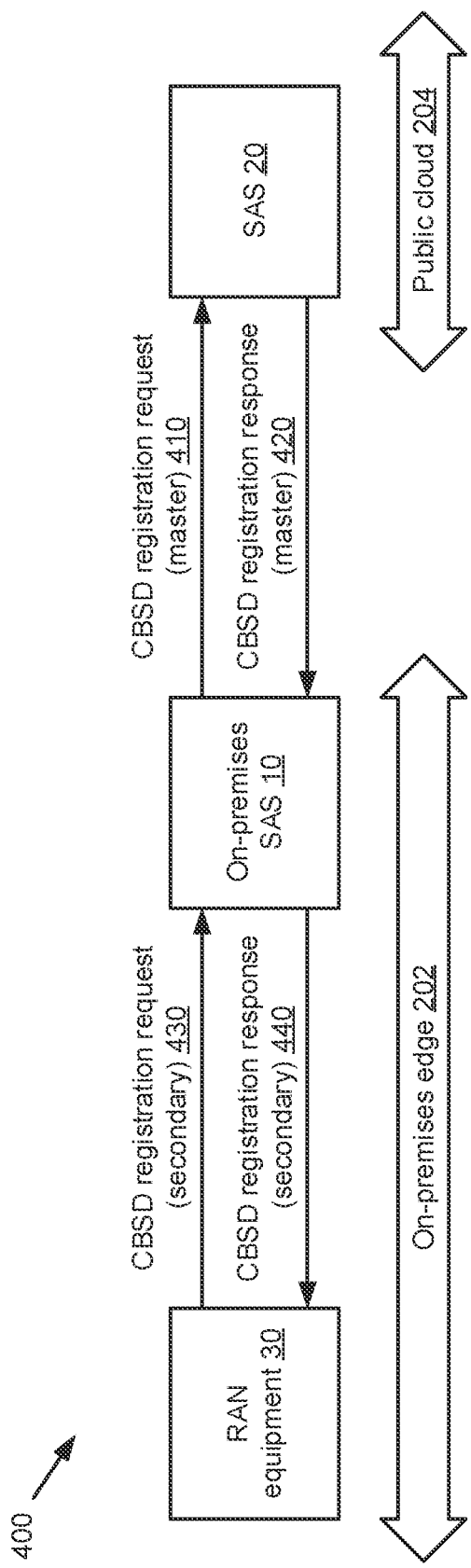
FIG. 4 is a diagram depicting an example technique for managing master and secondary spectrum grants in accordance with various implementations described herein.

Turning now to FIG. 4, a diagram 400 depicting an example technique for managing master and secondary spectrum grants is provided. Repetitive description of like elements that are employed in other embodiments described herein is omitted for brevity. More particularly, the technique shown by diagram 400 can be utilized by the on-premises SAS 10 to request a master grant, out of which multiple smaller secondary grants can be derived. As described above, a secondary grant can be requested by RAN equipment 30 and provided by the on-premises SAS 10 with a single bidirectional message exchange.

As shown at 410, the on-premises SAS 10 can utilize a registration request procedure, e.g., initiated via a CBSD Registration Request message, to request a master grant for a broad and general set of spectrum resources from the SAS 20 associated with the public cloud 204. In an implementation, the resources (e.g., location, duration in time, signal strength, etc.) requested via the master grant can be kept to a larger upper bound. For instance, the on-premises SAS 10 can request one or more 10 MHz portions of the CBRS spectrum in connection with the master grant in order to facilitate multiple smaller secondary grants.

As a result of the registration request procedure initiated by the on-premises SAS 10, the SAS 20 can either issue or deny a PAL for the requested resources, e.g., via an exchange initiated via a CBSD Registration Response message, as shown at 420. Whether the SAS 20 grants or denies the requested master grant could depend on current availability and/or usage of the requested resources and/or other suitable factors.

If the SAS 20 issues the PAL for the master grant, the on-premises SAS 10 can add the granted resources to its available pool of resources, e.g., as described above. Subsequently, RAN equipment 30, such as a RAN CBSD, can request spectrum through SAS-specific interfaces from the on-premises SAS 10, instead of the SAS 20. As shown in diagram 400, the RAN equipment 30 can request resources from the on-premises SAS 10 via a single CBSD Registration Request message, as shown at 430.

As shown at 440, the on-premises SAS 10 can map the incoming request from the RAN equipment 30 against its local master grants and secondary grants, e.g., as described above with respect to FIG. 3. Based on this analysis, the on-premises SAS 10 can either derive a secondary grant or deny the request. If the on-premises SAS 10 derives the secondary grant, it can provide a single message, such as a CBSD Registration Response message, to the RAN equipment 30 indicating the secondary grant, as shown at 440.

In an implementation, the on-premises SAS 10 can submit additional master grant requests as shown at 410 to adjust the spectrum grants available to the on-premises SAS 10. Additionally, the secondary grant request procedure shown at 430 and 440 can be repeated for respective attached CBSD devices and/or other RAN equipment 30, e.g., in response to changing spectrum utilization and/or other factors.

Figure 5:
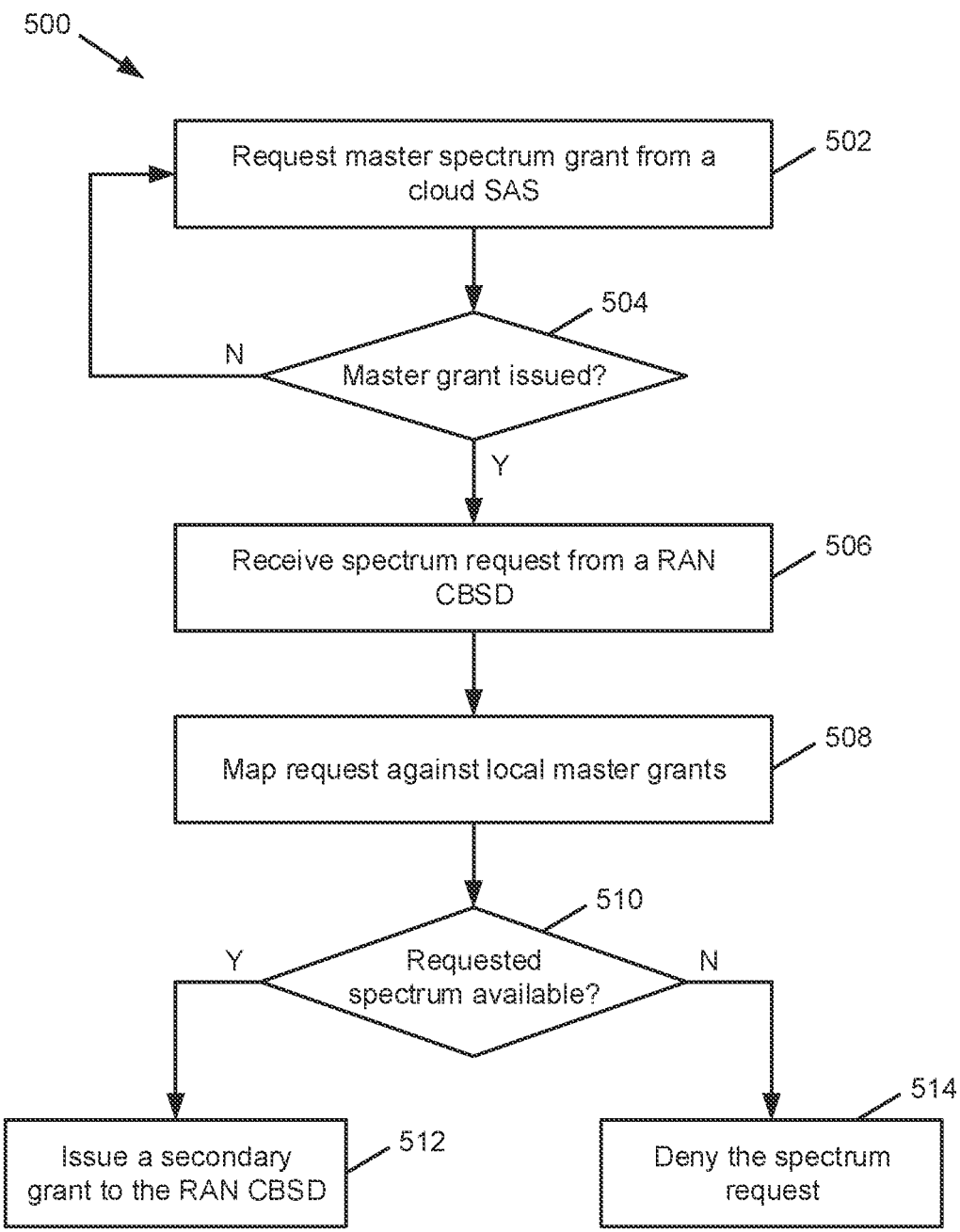
FIG. 5 is of a method that facilitates performance of the operations shown in FIG. 4 in accordance with various implementations described herein.

Referring now to FIG. 5, and with further reference to FIG. 4, a flow diagram of a method 500 that can be utilized by the on-premises SAS 10 to facilitate the master and secondary grants shown in diagram 400 is illustrated. At 502, the on-premises SAS 10 can request a master spectrum grant from a cloud SAS, e.g., a SAS 20 associated with a public cloud 204, as shown at 410.

At 504, the on-premises SAS 10 can determine whether the requested master grant was issued, e.g., by the SAS 20 as shown at 420. If the grant was not issued, the on-premises SAS 10 can repeat the master grant request at 502. Otherwise, the on-premises SAS 10 can update its inventory to reflect the new master grant.

At 506, the on-premises SAS 10 can receive a spectrum request from a RAN CBSD, e.g., via a registration request message from RAN equipment 30 as shown at 430. At 508, the on-premises SAS 10 can map the request received at 506 against its local master grants to facilitate a determination at 510 of whether the spectrum requested at 506 is available. If the requested spectrum is available, method 500 can proceed from 510 to 512, in which the on-premises SAS 10 issues a secondary grant to the RAN CBSD, e.g., via a registration response message as shown at 440. If, alternatively, the requested spectrum is not available, method 500 can instead proceed from 510 to 514, in which the on-premises SAS 10 denies the spectrum request from the RAN CBSD.

Figure 6:
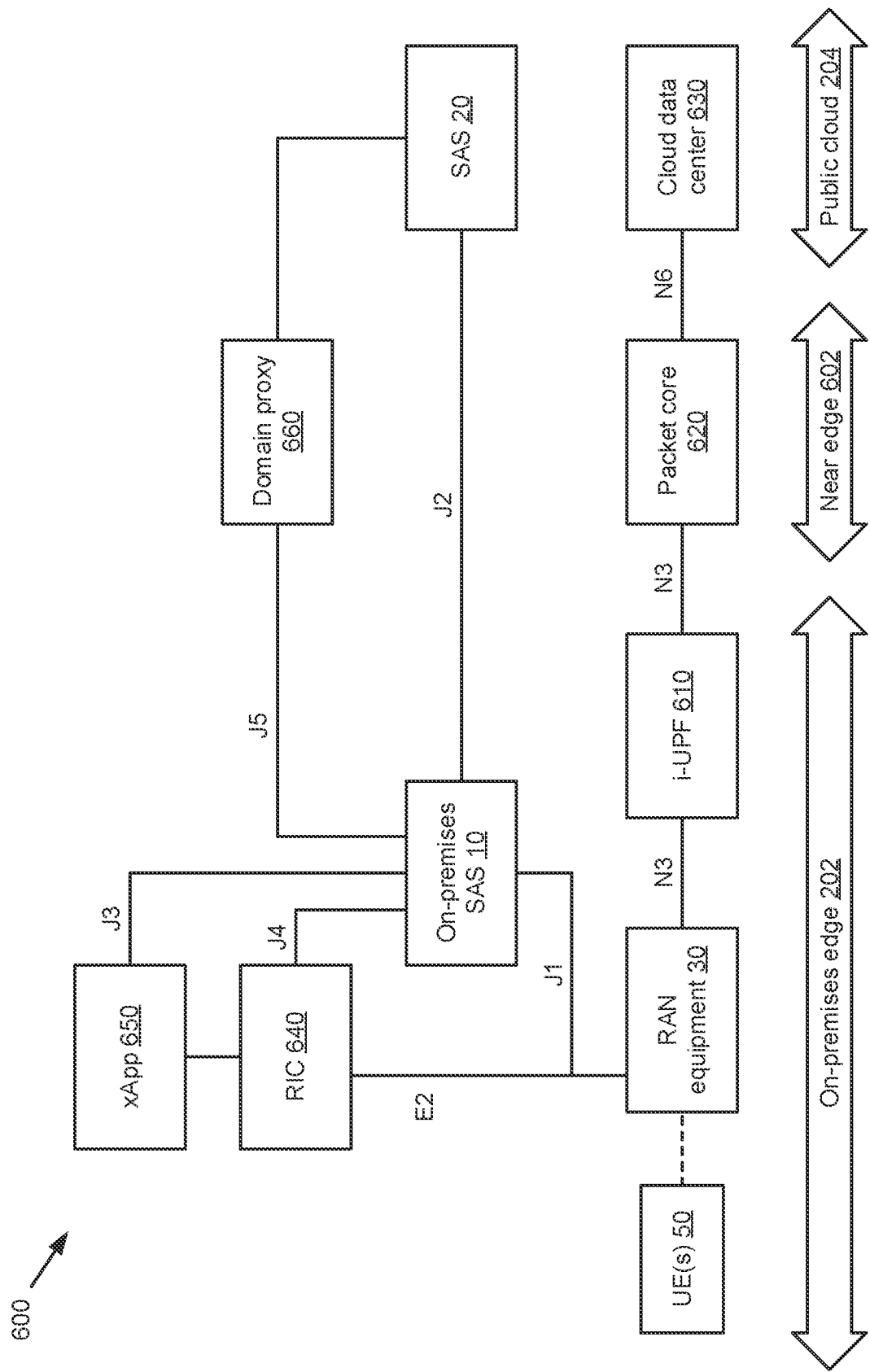
FIG. 6 is a diagram depicting an example network architecture in which various implementations described herein can function.

Turning next to FIG. 6, a diagram 600 depicting an example network architecture in which various implementations described herein can function is provided. It is noted that the network architecture shown in diagram 600 is merely one example of a network architecture that can be utilized in connection with the implementations described herein, and that other network architectures could also be used. Additionally, it is noted that while various elements shown in diagram 600 relate to a 5G communication network, other radio access technologies could also be used in a similar manner to that shown by diagram 600.

As shown in diagram 600, one or more user equipment devices (UEs) 50, such as mobile telephones, tablet or laptop computers, and/or other devices, can be enabled for communication over a RAN (e.g., a RAN operating in CBRS spectrum as described above, etc.) via a direct connection with RAN equipment 30, such as an eNB or gNB and/or other suitable equipment. The connection between the UE(s) 50 and the RAN equipment 30 can be established via any suitable connection techniques, either presently known in the art or developed in the future.

As further shown in diagram 600, the RAN equipment 30 can facilitate user plane communication via a connection to an Intermediate User Plane Function (i-UPF) 610 over one or more suitable interfaces, such as an N3 interface. The i-UPF 610 as shown in diagram 600 is located at the on-premises edge 202 with the UE(s) 50 and RAN equipment 30, and can communicate with a packet core 620 associated with a near edge 602 via the N3 interface and/or another suitable interface. In an implementation, the near edge 602 can operate as an intermediate network location between the on-premises edge 202 and the public cloud 204. For instance, the packet core 620 located on the near edge 602 can facilitate transmission and receipt of user plane data from one or more sources external to the near edge 602, such as a cloud data center 630 located on the public cloud 204, via an N6 interface and/or another suitable interface.

With regard to the control plane, the RAN equipment 30 shown in diagram 600 can establish a connection with the on-premises SAS 10 as described above via a direct, point-to-point (uninterrupted, continuous) interface between the RAN equipment 30 and the on-premises SAS 10, e.g., the J1 interface shown in diagram 600. Also or alternatively, the RAN equipment 30 can be connected to an Open RAN (O-RAN) RAN Intelligent Controller (RIC) 640, e.g., via an E2 interface. While not shown in diagram 600, the on-premises SAS 10 can be implemented wholly or in part via the RIC 640 and/or one or more application functions associated with the RIC 640, such as an xApp 650. In an implementation in which the on-premises SAS 10 is implemented separately from the RIC 640 and xApp 650, the on-premises SAS 10 can facilitate communication with the RIC 640 and xApp 650 via respective direct interfaces, e.g., J4 and J3 interfaces shown in diagram 600, respectively.

As further shown in diagram 600, the on-premises SAS 10 can facilitate direct communication with a SAS 20 associated with the public cloud 204 via a further direct interface between the on-premises SAS 10 and the SAS 20, e.g., the J2 interface shown in diagram 600. Also or alternatively, the on-premises SAS 10 can communicate with the SAS 20 indirectly through one or more intermediate entities, such as a domain proxy 660 located on the near edge 602, via a J5 interface and/or another suitable interface.

Figure 7:
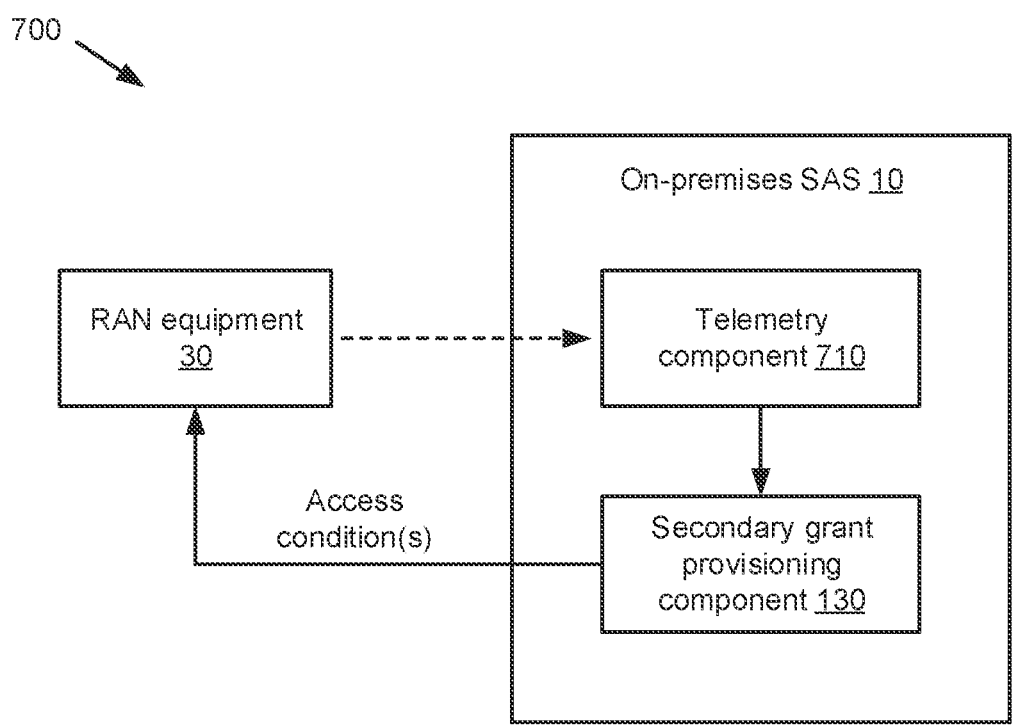
FIG. 7 is a block diagram of a system that facilitates application of access conditions to a spectrum grant in accordance with various implementations described herein.

Referring now to FIG. 7, a block diagram of a system 700 that facilitates application of access conditions to a spectrum grant is illustrated. Repetitive description of like elements that are employed in other embodiments described herein is omitted for brevity. System 700 as shown in FIG. 7 includes an on-premises SAS 10, which in turn includes a telemetry component 710 that can log telemetry information (e.g., location data, resource usage history, transmit power history, etc.) associated with RAN equipment 30. Based on information collected by the telemetry component 710, the secondary grant provisioning component 130 of the on-premises SAS 10 can specify and/or otherwise apply one or more access conditions to a new or ongoing resource grant provided to the RAN equipment 30 by the on-premises SAS 10. By way of example, access conditions that can be applied in this manner include new or updated restrictions on location or transmit power, fee schedules or other monetary charges for access to related spectrum, and/or any other appropriate condition(s).

Figure 8:
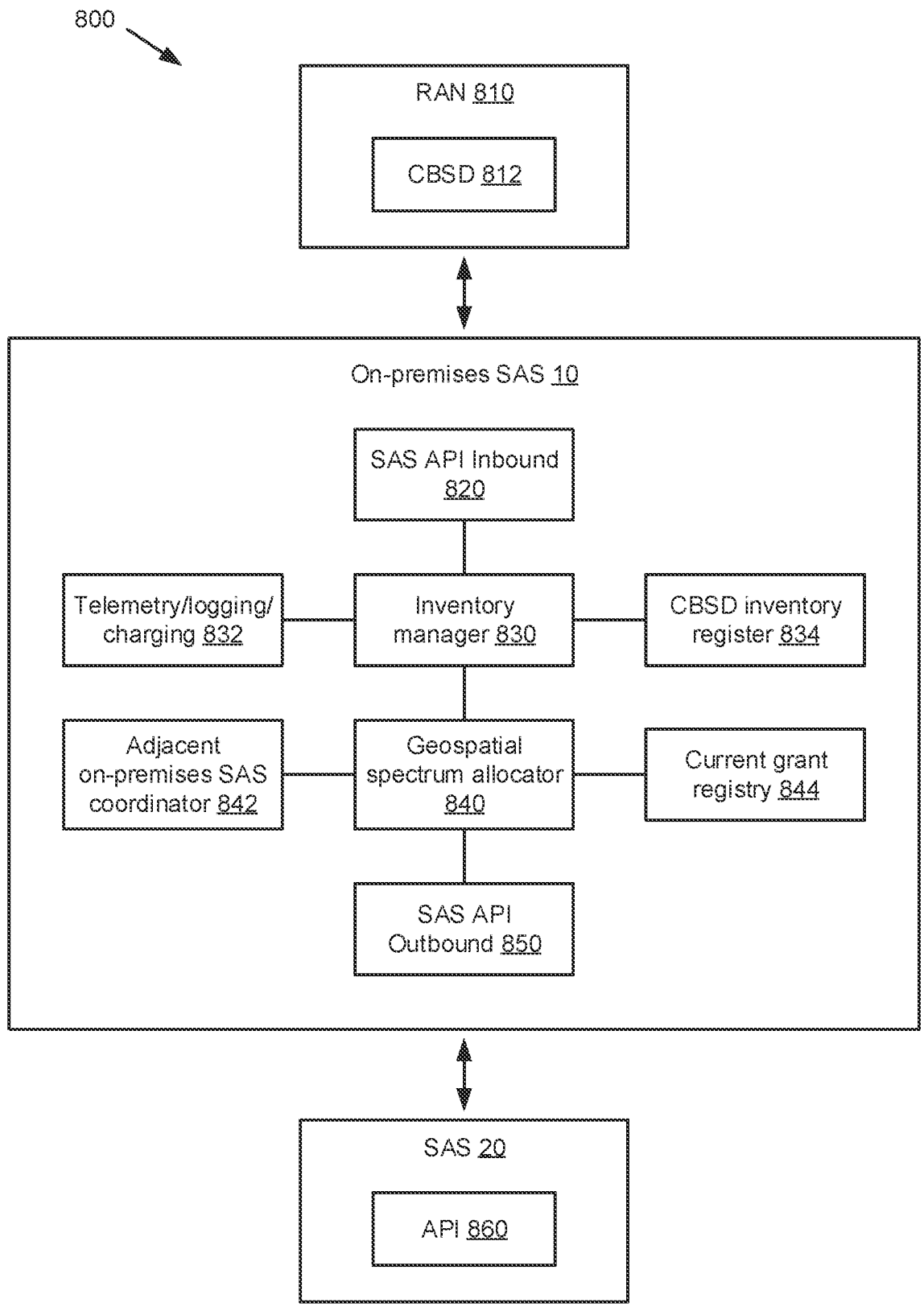
FIG. 8 is a diagram depicting an example architecture and respective interfaces that can be utilized by an on-premises spectrum access system in accordance with various implementations described herein.

Turning now to FIG. 8, a diagram 800 depicting an example architecture and respective interfaces that can be utilized by an on-premises SAS 10 is provided. As shown in diagram 800, the on-premises SAS 10 can communicate with one or more devices associated with a RAN 810, e.g., a CBSD 812 (and/or other suitable RAN equipment 30), via an inbound application programming interface (API) 820. For instance, the on-premises SAS 10 can implement the request processing component 310 described above with respect to FIG. 3 via the inbound API 820, e.g., to receive access requests for secondary spectrum grants from respective CBSDs 812.

The on-premises SAS 10 shown in diagram 800 further includes an inventory manager 830, which can maintain information relating to an inventory of spectrum resources available to the on-premises SAS 10, e.g., spectrum resources obtained via master grants from a SAS 20 as described above. The on-premises SAS 10 additionally includes a telemetry/logging/charging module 832, which can facilitate dynamic updates to the available spectrum inventory, e.g., based on telemetry information gathered as described above with respect to FIG. 7. As further shown in diagram 800, the inventory manager 830 can maintain information relating to respective RAN devices, e.g., CBSDs 812, to which the on-premises SAS 10 is connected via a CBSD inventory register 834 and/or other suitable data structure.

The on-premises SAS 10 in diagram 800 additionally includes a geospatial spectrum allocator 840, which serves as a central point of knowledge in the on-premises SAS 10 to handle incoming spectrum requests, e.g., spectrum requests from CBSDs 812. The geospatial spectrum allocator 840 can interact with an adjacent on-premises SAS coordinator 842, which can coordinate spectrum grants with other nearby on-premises SASs 10. For instance, since CBRS spectrum grants are localized to a given area, the adjacent on-premises SAS coordinator 842 can communicate with other nearby on-premises SASs 10 to facilitate swapping spectrum grants, to reduce interference between RANs 810 in neighboring areas, to bundle resources between adjacent on-premises SASs 10 to optimize localized spectrum grants, etc. As further shown by diagram 800, the geospatial spectrum allocator 840 can also be associated with a current grant registry 844, which can maintain information relating to the currently active secondary grants enabled by the on-premises SAS 10 and/or other nearby devices. In an implementation, the current grant registry 844 can be implemented in a similar manner to the inventory register 40 described above with respect to FIG. 3.

As diagram 800 further illustrates, the on-premises SAS 10 can utilize an outbound API 850 to communicate with a central SAS 20, e.g., for obtaining master grants as described above. In an implementation, the inbound API 820 and the outbound API 850 can be distinct APIs that are configured to facilitate communication with their respective designated end points.

Figure 9:
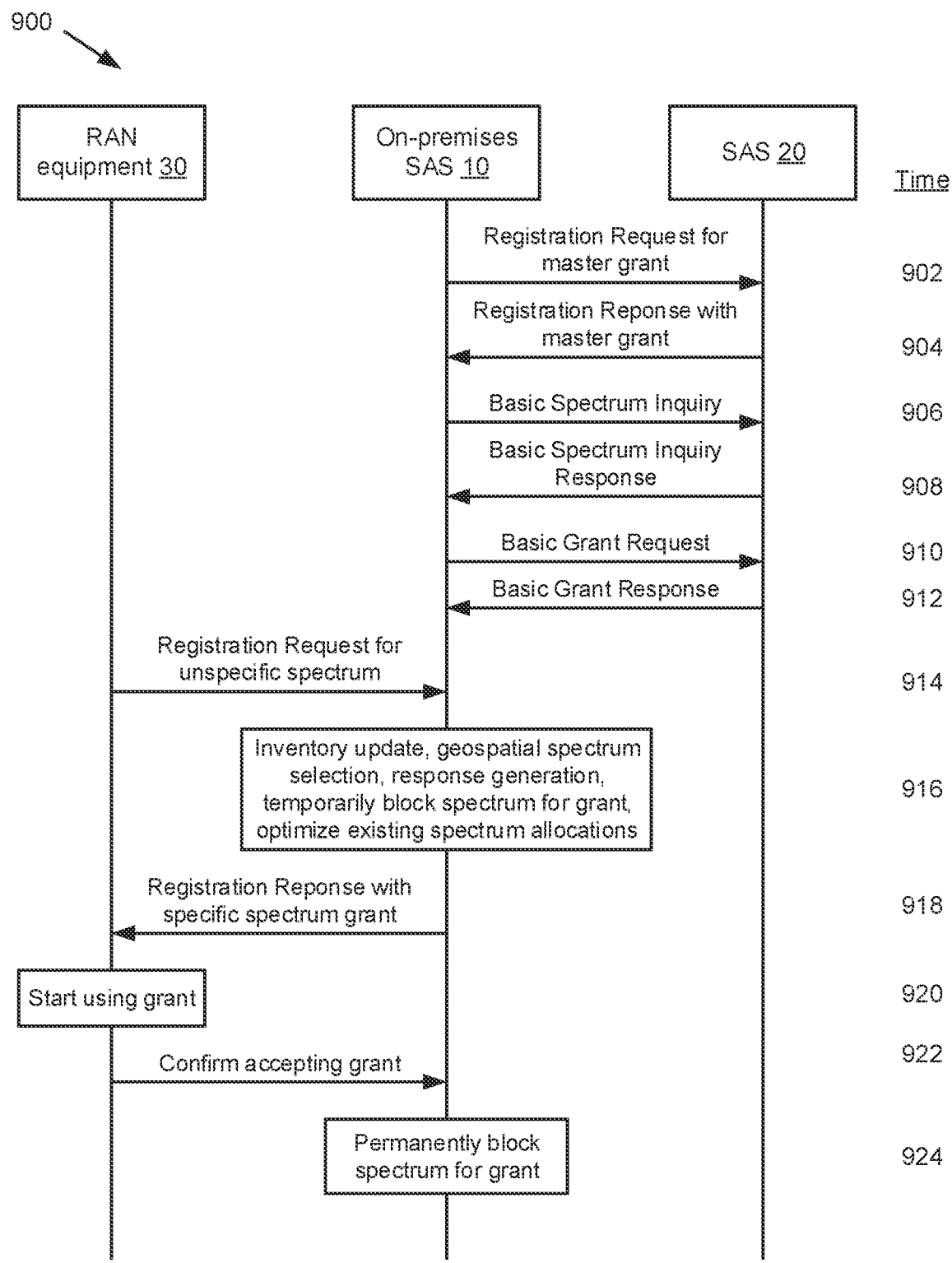
FIGS. 9-11 are messaging flow diagrams depicting respective techniques for handling spectrum requests from radio access network equipment in accordance with various implementations described herein.
Figure 10:
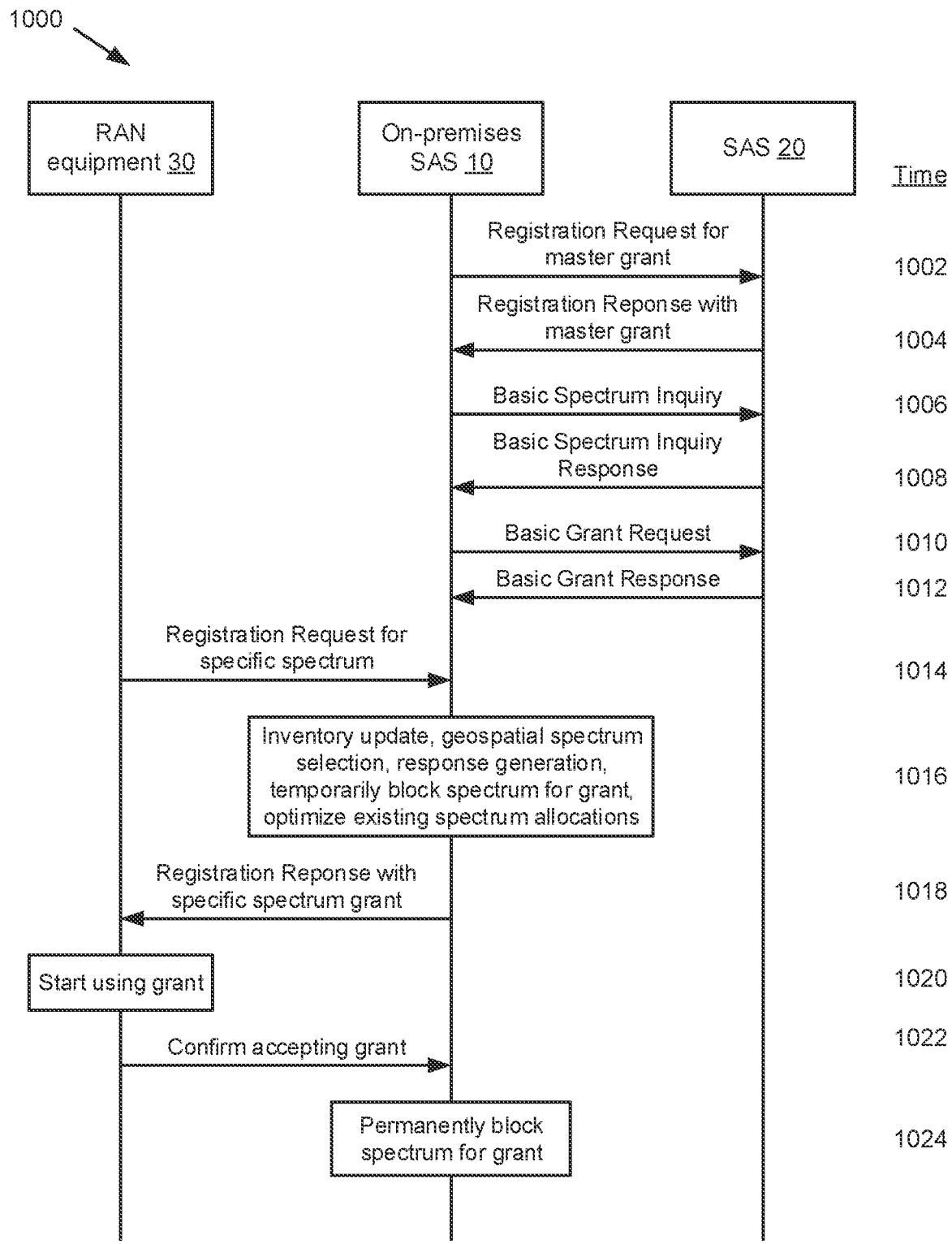
Figure 11:
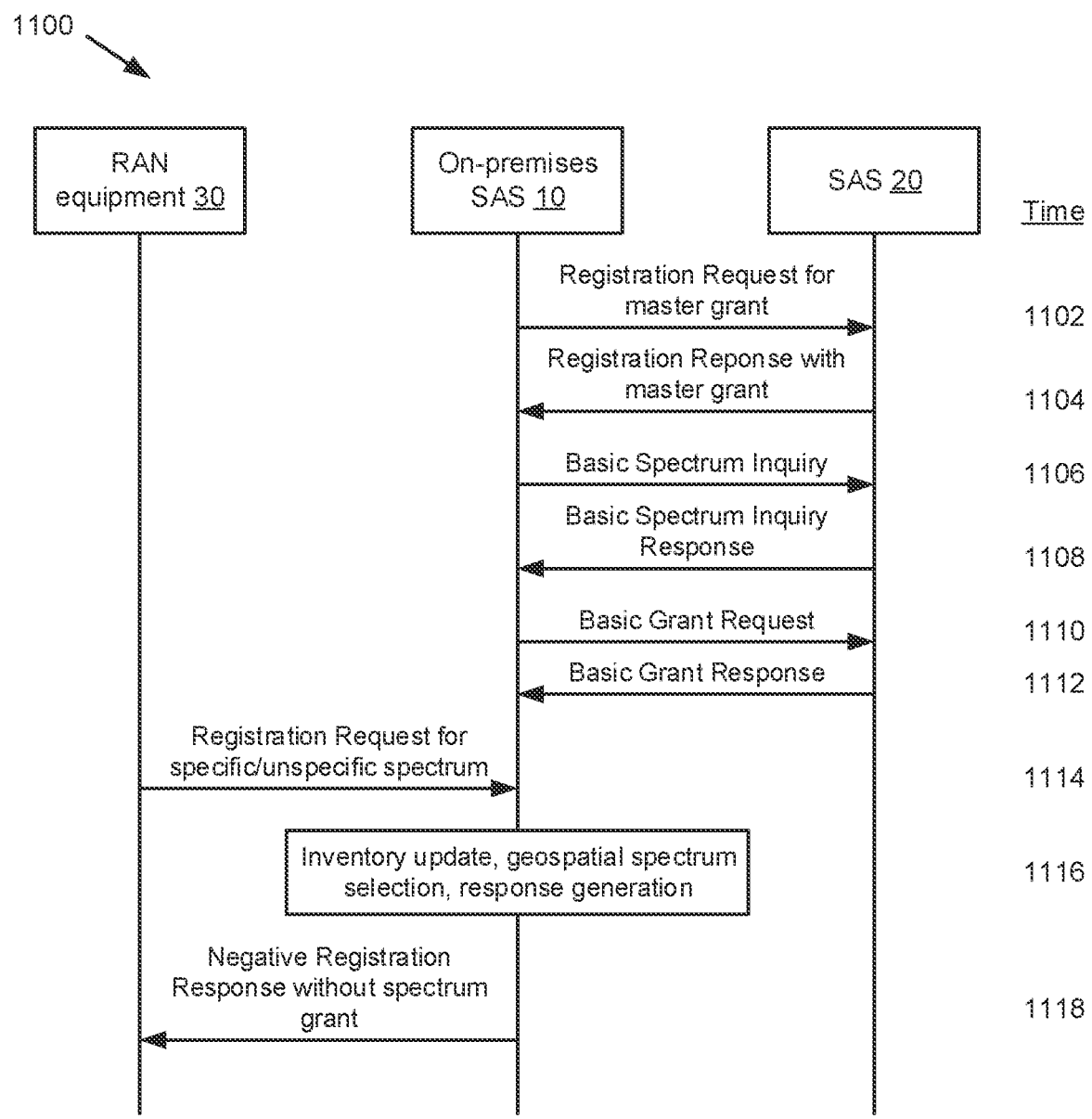

With reference now to FIGS. 9-11, messaging flow diagrams that depict respective techniques for handling spectrum requests from RAN equipment 30 are provided. More particularly, FIGS. 9-11 depict example messaging flows that can occur between an on-premises SAS 10, a SAS 20, and RAN equipment 30 in connection with a request for a secondary spectrum grant. It is noted that FIGS. 9-11 merely represent examples of procedures that could be utilized by these network elements, and that other procedures could also be used.

Diagram 900 in FIG. 9 illustrates a procedure that can be utilized by an on-premises SAS 10, a SAS 20, and RAN equipment 30 for an unspecific spectrum request. An "unspecific" spectrum request refers to a general request for spectrum resources that is not limited to a specific position in frequency. For instance, an unspecific request can include multiple specific candidates or options, or alternatively an unspecific request can specify a requested bandwidth without naming any specific candidate frequencies. Further, in the event that multiple bands are requested, an unspecific request could be fulfilled with nonconsecutive or noncontiguous bands unless otherwise specified.

The procedure shown by diagram 900 begins with the on-premises SAS 10 initiating a request for a master grant, e.g., via a CBSD registration process including three bidirectional message exchanges shown at times 902-912. More particularly, at time 902, the on-premises SAS 10 sends a CBSD Registration Request message to the SAS 20 for a given master grant. At time 904, the SAS 20 sends a CBSD Registration Response message to the on-premises SAS 10.

Next, at time 906, the on-premises SAS 10 sends a CBSD Basic Spectrum Inquiry message to the SAS 20. In response, the SAS 20 can check the availability of the spectrum requested by the on-premises SAS 10 for the master grant. Subsequently, at time 908, the SAS 20 can send a CBSD Basic Spectrum Inquiry Response message to the on-premises SAS 10 that indicates the availability of the spectrum. If the requested spectrum is available, the on-premises SAS 10 can submit a CBSD Basic Grant Request to the SAS 20 at time 910. At time 912, the SAS 20 can finalize the master grant to the on-premises SAS 10 by sending a CBSD Basic Grant Response message to the on-premises SAS.

As a result of the messaging shown at times 902-912, the on-premises SAS 10 can be given a master grant for a given portion of spectrum resources. Subsequently, at time 914, the on-premises SAS 10 can receive a CBSD Registration Request message, and/or another suitable message, from RAN equipment 30. Here, the registration request provided by the RAN equipment 30 is associated with a requested secondary grant for unspecific spectrum.

At time 916, the on-premises SAS 10 can determine the availability of unspecific spectrum within its obtained master grants by performing actions such as an inventory update (e.g., by an inventory manager 830 as shown in FIG. 8), geospatial spectrum selection (e.g., by a geospatial spectrum allocator 840 as shown in FIG. 8), and/or other suitable actions. In the example shown by diagram 900, the unspecific spectrum request is granted by the on-premises SAS 10. Accordingly, the on-premises SAS 10 can perform additional actions at time 916, including generating a response for transmission to the RAN equipment 30, temporarily blocking the spectrum to be granted to the RAN equipment 30, and performing optimizations to existing spectrum allocations as desired.

At time 918, the on-premises SAS 10 can confirm the grant to the RAN equipment 30 by sending a CBSD Registration Response message, and/or another suitable message, to the RAN equipment 30. In contrast to the master grant procedure performed between the on-premises SAS 10 and the SAS 20 at times 902-912, the registration response sent by the on-premises SAS 10 at time 918 completes the secondary grant process. Additionally, it is noted that while the registration request received from the RAN equipment 30 does not request specific spectrum, the registration response provided by the on-premises SAS 10 at time 1018 contains a specific spectrum grant, e.g., corresponding to the specific spectrum granted to the RAN equipment 30 by the on-premises SAS 10.

At time 920, the RAN equipment 30 can begin using the granted spectrum after receiving the registration response. The RAN equipment 30 can further transmit a confirmation to the on-premises SAS 10 at time 922 confirming acceptance of the secondary grant, and in response to this confirmation the on-premises SAS 10 can permanently block the granted spectrum at time 924.

Diagram 1000 in FIG. 10 illustrates a procedure that can be utilized by an on-premises SAS 10, a SAS 20, and RAN equipment 30 for a specific spectrum request. In contrast to an unspecific spectrum request, a specific spectrum request is a request for spectrum at a defined frequency or range of frequencies. The procedure shown in diagram 1000 can begin by the on-premises SAS 10 obtaining a master grant from the SAS 20 at times 1002-1012, e.g., using messages that are similar to those described above with respect to times 902-912 in diagram 900.

Next, at time 1014, the RAN equipment 30 sends a registration request, e.g., via a CBSD Registration Request message, to the on-premises SAS 10 for specific spectrum associated with a requested secondary grant. At time 1016, the on-premises SAS 10 can process the request received at time 1014 using similar operations to those described above at time 914 in diagram 900, with the exception that the operations performed at time 1016 can be limited to the specific spectrum requested at time 1014.

In the example shown by diagram 1000, the specific spectrum requested by the RAN equipment 30 is available for grant. Accordingly, at time 1018, the on-premises SAS 10 can complete the secondary grant by sending a CBSD Registration Response message, and/or another suitable responsive message, to the RAN equipment 30 confirming the specific spectrum grant. Subsequently, the RAN equipment 30 can begin using the granted resources at time 1020 and confirm the secondary grant to the on-premises SAS 10 at time 1022, and the on-premises SAS 10 can permanently block the granted spectrum at time 1024, in a similar manner to that described above with respect to times 920-924 in diagram 900.

Diagram 1100 in FIG. 11 illustrates a procedure that can be utilized by the on-premises SAS 10 to deny a secondary grant to RAN equipment 30. Similar to diagram 1000 in FIG. 10, the procedure shown in diagram 1100 can begin by the on-premises SAS 10 obtaining a master grant from the SAS 20 at times 1102-1112, e.g., using messages that are similar to those described above with respect to times 902-912 in diagram 900. Next, at time 1114, the RAN equipment 30 can provide a registration request to the on-premises SAS 10 for a secondary grant.

At time 1116, the on-premises SAS 10 can check the availability of the requested (specific or unspecific) spectrum, e.g., via an inventory update, geospatial spectrum selection, and/or other operations. Here, the on-premises SAS 10 determines at time 1116 that the requested secondary grant is unavailable, e.g., due to the requested spectrum already being granted to other RAN equipment 30. Accordingly, the on-premises SAS 10 can deny the request for the secondary request at time 1118 by sending a negative registration response to the RAN equipment 30, e.g., via a CBSD Negative Registration Response message or the like, that indicates that the secondary grant was not fulfilled.

Figure 12:
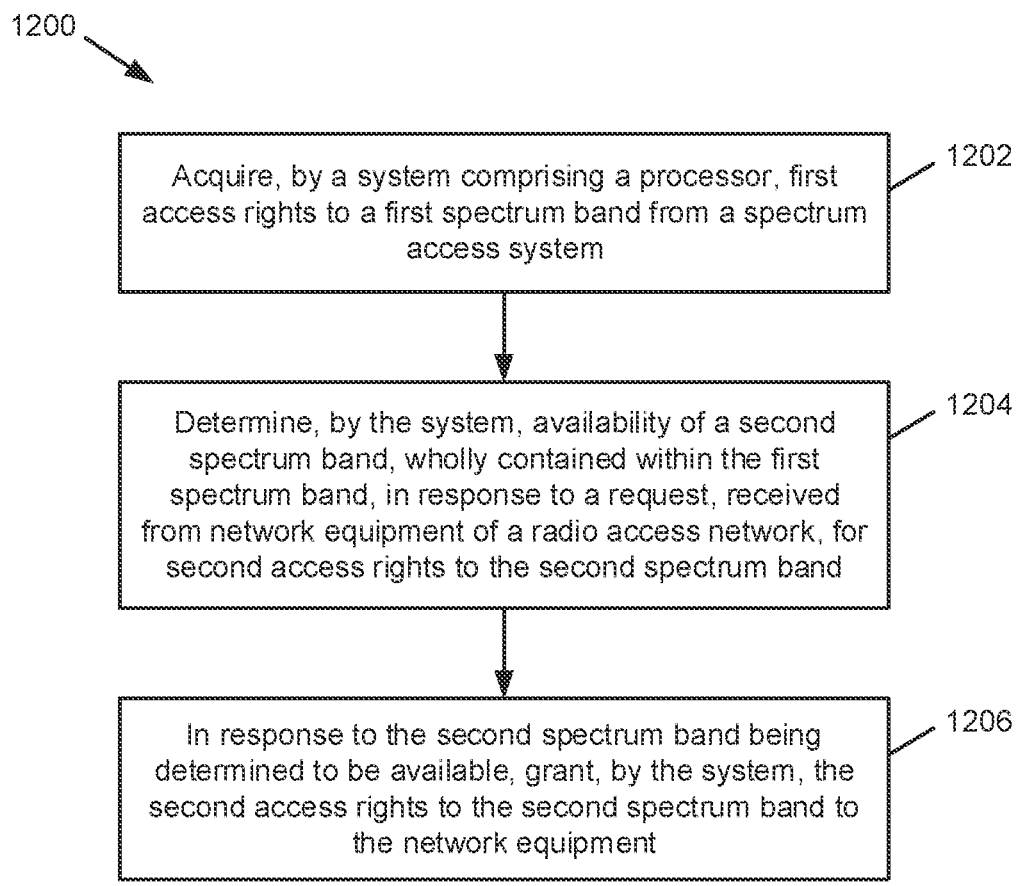
FIG. 12 is a flow diagram of a method that facilitates a low-latency network edge spectrum-as-a-service controller in accordance with various implementations described herein.

Referring next to FIG. 12, a flow diagram of a method 1200 that facilitates a low-latency network edge spectrum-as-a-service controller is illustrated. At 1202, a system operatively coupled to a processor (e.g., an on-premises SAS 10) can acquire (e.g., via a master grant acquisition component 110) first access rights to a first spectrum band from a SAS (e.g., SAS 20).

At 1204, the system can determine (e.g., by a spectrum mapping component 120) availability of a second spectrum band, wholly contained within the first spectrum band for which access rights were acquired at 1202, in response to a request, received from network equipment of a RAN (e.g., RAN equipment 30), for second access rights to the second spectrum band.

At 1206, in response to the second spectrum grant being determined (e.g., by the spectrum mapping component 120) to be available at 1204, the system can grant (e.g., by a secondary grant provisioning component 130) the second access rights to the second spectrum band to the network equipment that requested the second access rights at 1204.

FIGS. 5 and 12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
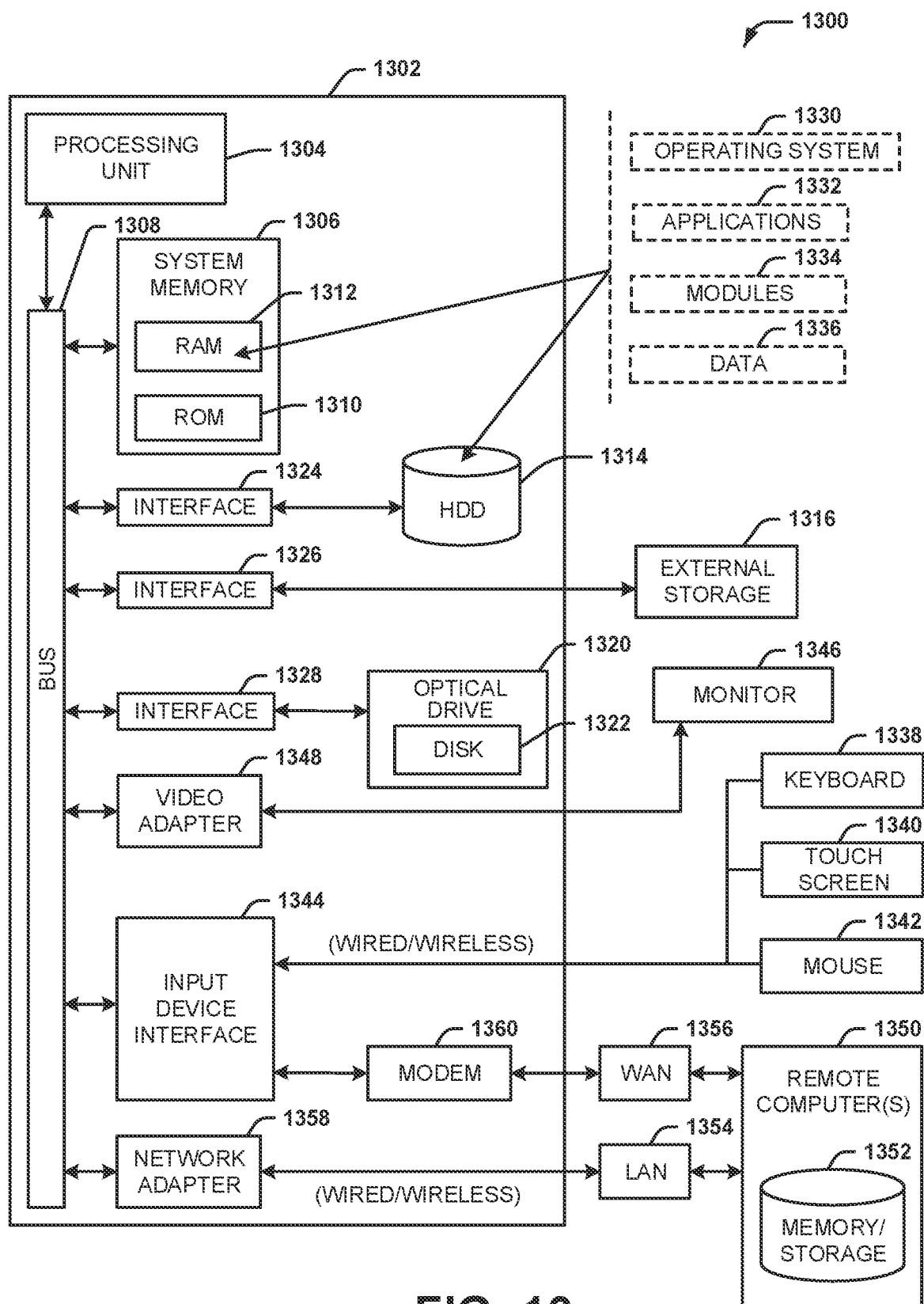
FIG. 13 is a diagram of an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores executable components; and
a processor that executes the executable components stored in the memory, wherein the executable components comprise:
a master grant acquisition component that obtains, from a spectrum access system that is external to the system via a spectrum request procedure initiated at the spectrum access system by the system, an access license for a first spectrum band;
a spectrum mapping component that determines availability of a second spectrum band, wholly contained within the first spectrum band, in response to receiving an access request for the second spectrum band from network equipment associated with a radio access network, wherein the network equipment provides the access request to the system without providing the access request to the spectrum access system; and
a secondary grant provisioning component that, in response to the spectrum mapping component determining that the second spectrum band is available, grants access to the second spectrum band to the network equipment without exchanging any messages with the spectrum access system.

2. The system of claim 1, wherein the executable components further comprise:
a registration component that, in response to the secondary grant provisioning component granting the access to the second spectrum band, assigns the second spectrum band to the radio access network in an inventory register.

3. The system of claim 2, wherein the access request indicates a spectrum frequency range associated with the second spectrum band, and wherein the spectrum mapping component determines that the second spectrum band is available in response to determining that an entirety of the spectrum frequency range is unassigned in the inventory register.

4. The system of claim 2, wherein the access request indicates a requested bandwidth associated with the second spectrum band, and wherein the secondary grant provisioning component grants the access to the second spectrum band at a spectrum frequency range that is unassigned in the inventory register.

5. The system of claim 1, wherein the executable components further comprise:
a request processing component that receives, from the network equipment, the access request for the second spectrum band via a registration request message.

6. The system of claim 5, wherein the master grant acquisition component obtains the access license from the spectrum access system via a first application programming interface, and wherein the request processing component receives the access request from the network equipment via a second application programming interface.

7. The system of claim 6, wherein the first application programming interface is configured to facilitate first communication between the system and the spectrum access system, and the second application programming interface is configured to facilitate second communication between the system and the network equipment without facilitating third communication between the spectrum access system and the network equipment.

8. The system of claim 5, wherein the request processing component receives the access request from the network equipment via a direct point-to-point interface between the system and the network equipment.

9. The system of claim 5, wherein the registration request message is a Citizens Broadband Radio Service Device (CBSD) Registration Request message that comprises the access request for the second spectrum band, and wherein the request processing component causes the spectrum mapping component to determine the availability of the second spectrum band without receiving any other messages, other than the CBSD Registration Request message, from the network equipment.

10. The system of claim 1, wherein the secondary grant provisioning component grants the access to the second spectrum band by sending a registration response message to the network equipment without sending any other messages to the network equipment.

11. The system of claim 1, wherein the executable components further comprise:
a telemetry component that logs telemetry information associated with the radio access network, wherein the secondary grant provisioning component specifies an access condition for the second spectrum band based on the telemetry information.

12. A method, comprising:
acquiring, by a system comprising a processor, first access rights to a first spectrum band from a spectrum access system that is external to the system via a spectrum request procedure initiated at the spectrum access system by the system;
determining, by the system, availability of a second spectrum band, wholly contained within the first spectrum band, in response to a request, received from network equipment of a radio access network, for second access rights to the second spectrum band, wherein the request is provided by the network equipment to the system without providing the request to the spectrum access system; and
in response to the second spectrum band being determined to be available, granting, by the system, the second access rights to the second spectrum band to the network equipment without exchanging any messages with the spectrum access system.

13. The method of claim 12, further comprising:
recording, by the system in response to granting the second access rights, the radio access network and the second spectrum band in a data register.

14. The method of claim 12, further comprising:
receiving, by the system, the request for the second access rights from the network equipment via a registration request message.

15. The method of claim 14, wherein receiving the request for the second access rights comprises receiving the request for the second access rights via a direct and continuous interface between the system and the network equipment.

16. The method of claim 12, wherein granting the second access rights comprises granting the second access rights by sending a registration response message to the network equipment without sending any other messages to the network equipment.

17. A non-transitory machine-readable medium comprising computer executable instructions that, when executed by a processor of a system entity, facilitate performance of operations, the operations comprising:

receiving, from a spectrum access system that is separate from the system entity, an allocation for a first spectrum band as a result of a spectrum access procedure initiated at the spectrum access system by the system entity;

determining availability of a second spectrum band, wholly contained within the first spectrum band, in response to a request, received from network equipment of a radio access network, for access to the second spectrum band, wherein the network equipment sends the request to the system entity without sending the request to the spectrum access system; and in response to the second spectrum band being determined to be available, granting the access to the second spectrum band to the network equipment without exchanging any messages with the spectrum access system.

18. The non-transitory machine-readable medium of claim 17, wherein the operations further comprise:

in response to granting the access to the second spectrum band, assigning the second spectrum band to the radio access network in a data structure.

19. The non-transitory machine-readable medium of claim 17, wherein the operations further comprise:

receiving a registration request message from the network equipment, the registration request message comprising the request for the access to the second spectrum band.

20. The non-transitory machine-readable medium of claim 19, wherein receiving the allocation for the first spectrum band comprises receiving the allocation for the first spectrum band via a first application programming interface, and wherein receiving the registration request message comprises receiving the registration request message via a second application programming interface.

* * * * *